July 6, 1943. C. A. BROWN 2,323,296
COMBINED HOLDERS AND DRIP COLLECTORS FOR TABLE UTENSILS
Filed Aug. 2, 1941
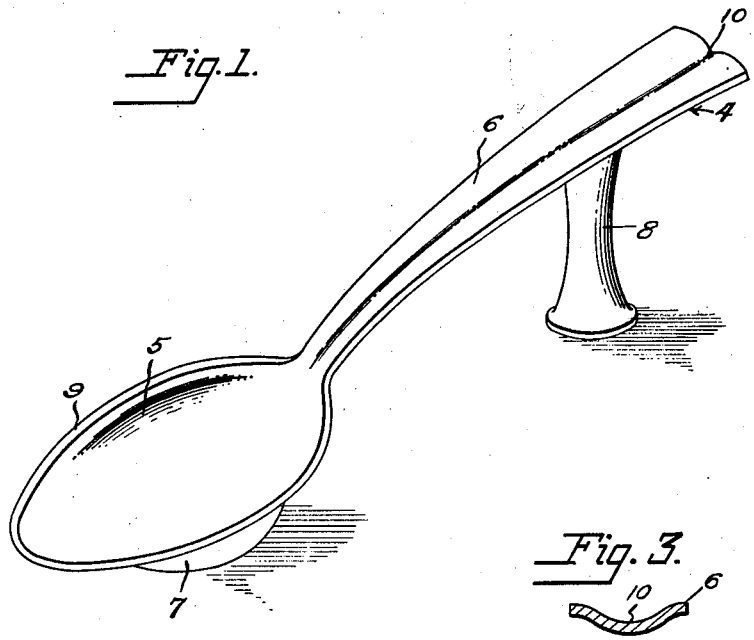
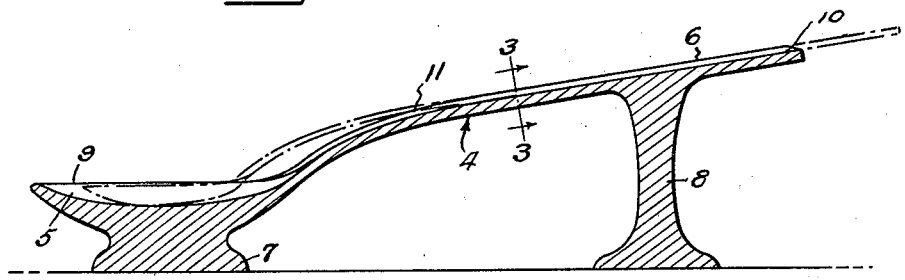
Inventor
Catherine A. Brown Patented July 6, 1943

2,323,296

UNITED STATES PATENT OFFICE 2,323,296

COMBINED HOLDER AND DRIP COLLECTOR FOR TABLE UTENSILS

Catherine A. Brown, Atlanta, Ga.

Application August 2, 1941, Serial No. 405,264

3 Claims. (Cl. 65—65)

This invention relates to a spoon holder; and more particularly, one designed to receive a spoon after use.

In many instances, a spoon is used for stirring a liquid such as iced beverages, and due to the length of the spoon is cannot be placed on the glass holder or saucer conveniently, and likewise, it is not desirable to leave it in the glass. I have found that a holder of ornate appearance made of metal or other material can be so designed that it not only performs a satisfactory mechanical function for receiving the spoon, but is attractive in appearance and may remain on the table without objection.

Since the holder is designed to collect moisture adhering to the spoon preventing dripping onto the supporting surface, the holder must assume the proper angle with relation to the supporting surface, and have a bowl of sufficient size to receive the bowl of the spoon.

The principal object of the invention is to provide a holder of metal or other suitable material of pleasing appearance, with support beneath both ends so as to receive an implement such as a spoon after it has been subjected to moisture through stirring of the liquid.

Another object is to provide a holder having a bowl of sufficient area to safely hold any drippings from the spoon and with a trough-like support extending from the bowl to receive the handle of the spoon so that the drippings will be directed downwardly off the handle into the bowl, the relation between the handle support and bowl being such that the drippings from the handle will drain into the bowl without overflowing due to gravity and at the same time have sufficient depth in the bowl to act as a basin to retain the drippings.

It is also advisable to have the edges of the bowl of the holder substantially parallel to the supporting surface.

Other objects will be disclosed in the specification and claims forming a part of this application.

In the drawing:

Figure 1 is a perspective of the holder;

Figure 2 is a vertical section showing a long handled ice tea spoon in place for purposes of illustration; and Figure 3 is a cross section taken on the line 3—3 of Figure 2.

Referring to the drawing, in which similar parts are designated by like numerals:

Numeral 4 designates a holder for spoons and the like having a drip bowl 5 and drain support 6. Beneath the bowl 5 is a base 7, and beneath the drain support 6 is a pedestal base 8, both formed as a part of the bowl and drain support. The bowl 5 presents a concave receptacle whose upper edge 9 is substantially parallel to the lower surface of the base 7. The drain support 6 is V-shaped in cross section forming a trough 10 to receive a spoon 11 of the ice tea type, and at the same time, permit the drippings from the spoon to drain by way of the trough 10 into the bowl 5. The pedestal base 8 is of sufficient height to cause drainage by gravity by way of the trough 10. Likewise it is not too high to tilt the bowl 5 or to cause the drippings from the spoon 11 to overflow the bowl 5. There is a definite structural cooperation and relationship between the pedestal base 8 and the base 7; and likewise between the drain support 6 and the bowl 9, all parts being proportioned so as to accomplish the desired result.

Obviously, the scope of the invention is not limited to an ice tea spoon. This presents an acute and unusual problem because of its length, but the principle of the invention could be utilized in connection with holders for other implements which are utilized in stirring beverages.

The pedestal base 8 can be utilized as a handle in pouring the drippings from the bowl 5.

Numerous variations may doubtless be devised by persons skilled in the art without departing from the principles of my invention. I, therefore, desire no limitations to be imposed on my invention, except such as are indicated in the appended claims.

What I claim is:

1. A holder for table utensils or the like comprising a drip bowl having a concave interior, a supporting base beneath said bowl, the bottom surface of said support being substantially parallel with the upper edge of said bowl, a longitudinal drip support extending angularly upwardly from said bowl and having a trough formed therein and extending into said bowl, and a supporting base extending from the underside of said drip support.

2. A holder for table utensils or the like comprising a drip bowl having a concave interior, a supporting base beneath said bowl, the bottom surface of said support being substantially parallel with the upper edge of said bowl, a longitudinal drip support extending angularly upwardly from said bowl and having a trough formed therein and extending into said bowl, a pedestal base support formed as a handle extending from the underside of said drip support.

3. A holder for table utensils and the like comprising a drip bowl having a concave interior, a supporting base beneath said bowl, a longitudinal drip support extending upwardly from said bowl and having a gutter formed therein, the gutter draining into said bowl, and a supporting base extending from beneath said drip support, one of said supporting bases having a flat bottom.

CATHERINE A. BROWN.